United States Patent
Matsui et al.

(10) Patent No.: US 8,780,918 B2
(45) Date of Patent: Jul. 15, 2014

(54) DATA PROCESSING APPARATUS AND REDUNDANCY SWITCHING METHOD

(75) Inventors: Hideki Matsui, Kawasaki (JP); Mitsuhiro Kawaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 495 days.

(21) Appl. No.: 12/726,785

(22) Filed: Mar. 18, 2010

(65) Prior Publication Data

US 2010/0238936 A1 Sep. 23, 2010

(30) Foreign Application Priority Data

Mar. 19, 2009 (JP) ................................. 2009-68424

(51) Int. Cl.
| | |
|---|---|
| H04L 12/28 | (2006.01) |
| H04L 12/56 | (2006.01) |
| H04L 1/00 | (2006.01) |
| H04J 14/02 | (2006.01) |
| H04B 1/74 | (2006.01) |
| H04B 10/032 | (2013.01) |
| H04J 3/16 | (2006.01) |

(52) U.S. Cl.
CPC .............. *H04L 49/552* (2013.01); *H04L 49/55* (2013.01); *H04L 49/3072* (2013.01); *H04L 49/1523* (2013.01); *H04L 1/00* (2013.01); *H04J 14/0293* (2013.01); *H04J 14/0287* (2013.01); *H04J 3/1652* (2013.01); *H04B 1/74* (2013.01); *H04B 10/032* (2013.01)
USPC .......................................... 370/394; 370/351

(58) Field of Classification Search
None
See application file for complete search history.

(56) References Cited

U.S. PATENT DOCUMENTS

| | | | | |
|---|---|---|---|---|
| 6,532,234 | B1 * | 3/2003 | Yoshikawa et al. | 370/395.4 |
| 6,535,479 | B1 * | 3/2003 | Ikematsu | 370/220 |
| 7,733,865 | B2 * | 6/2010 | Morimura et al. | 370/392 |
| 7,830,797 | B1 * | 11/2010 | Nachum et al. | 370/230.1 |
| 2003/0198252 | A1 * | 10/2003 | Thrysoe | 370/466 |
| 2004/0258023 | A1 * | 12/2004 | Sakamoto et al. | 370/331 |
| 2005/0190762 | A1 * | 9/2005 | Kobayashi | 370/389 |
| 2006/0126510 | A1 * | 6/2006 | Russell | 370/235 |
| 2006/0165125 | A1 * | 7/2006 | Fushimi et al. | 370/474 |
| 2007/0237180 | A1 * | 10/2007 | Park et al. | 370/474 |
| 2007/0237185 | A1 * | 10/2007 | Pereira et al. | 370/503 |
| 2007/0292129 | A1 * | 12/2007 | Yan et al. | 398/5 |
| 2009/0034633 | A1 * | 2/2009 | Rodirguez et al. | 375/240.28 |

FOREIGN PATENT DOCUMENTS

| | | |
|---|---|---|
| JP | 5-130141 | 5/1993 |
| JP | 6-327074 | 11/1994 |

* cited by examiner

*Primary Examiner* — Ayaz Sheikh
*Assistant Examiner* — Peter Chau
(74) *Attorney, Agent, or Firm* — Staas & Halsey LLP

(57) ABSTRACT

A data processing apparatus includes a first frame processing unit that fragments a first input frame and identifies a head of the first input frame and outputs first head position information; a second frame processing unit that fragments a second input frame which is a redundant frame of the first input frame and is input asynchronously with the first input frame, identifies a head of the second frame, and outputs second head position information; a first and a second storage unit that receive and store the fragmented pieces of data output from the first and the second frame processing units respectively; and a fragmented data processing unit that reads the fragmented pieces of data out of one of the first and second storage units based on the first and second head position information and outputs the fragmented data.

6 Claims, 14 Drawing Sheets

FIG. 4A
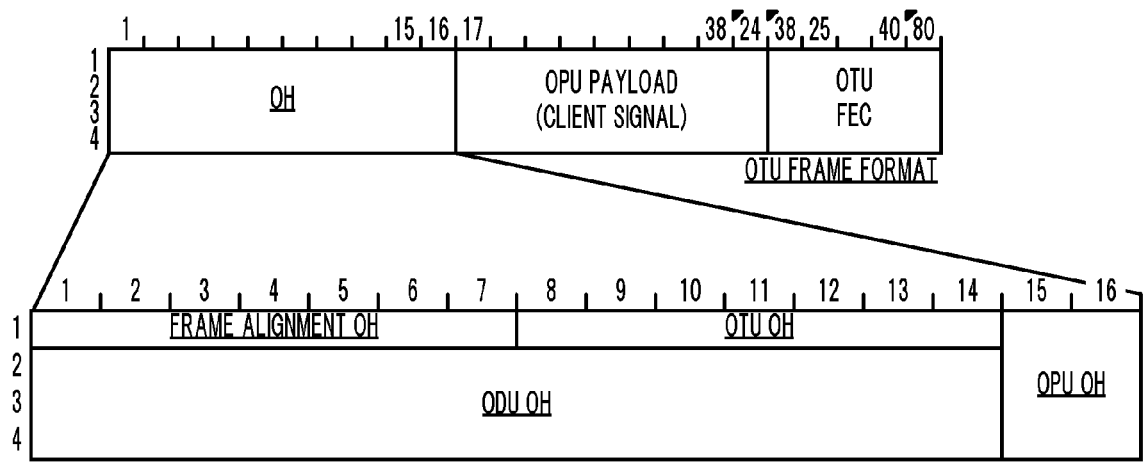
FIG. 4B
FIG. 4C
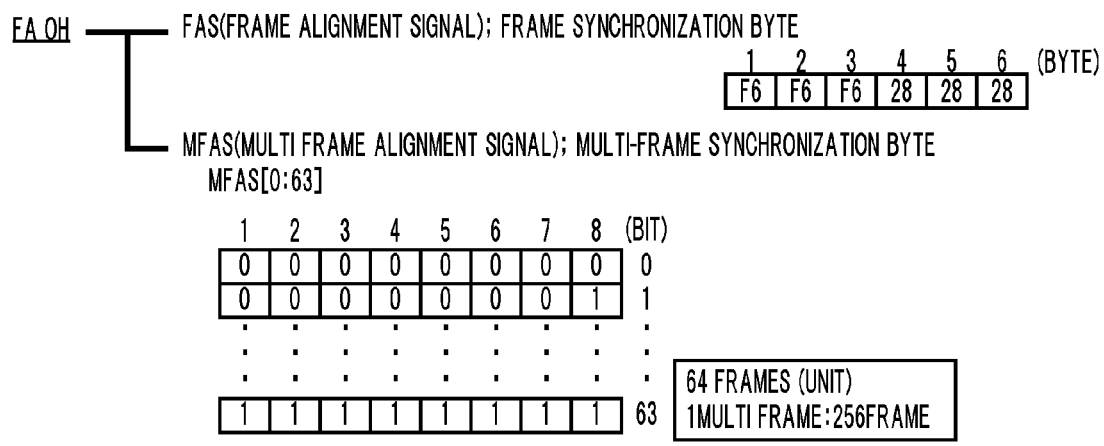

FIG. 5

| | | |
|---|---|---|
| C1 | CONTROL SYSTEM (CPU AND OTHERS) | |
| C2 | IF#24 | IF#12 |
| | IF#23 | IF#11 |
| | IF#22 | IF#10 |
| | IF#21 | IF#9 |
| | IF#20 | IF#8 |
| | IF#19 | IF#7 |
| C3 | SWITCH FABRIC(PTCT) | |
| C4 | SWITCH FABRIC(WORK) | |
| C5 | IF#18 | IF#6 |
| | IF#17 | IF#5 |
| | IF#16 | IF#4 |
| | IF#15 | IF#3 |
| | IF#14 | IF#2 |
| | IF#13 | IF#1 |

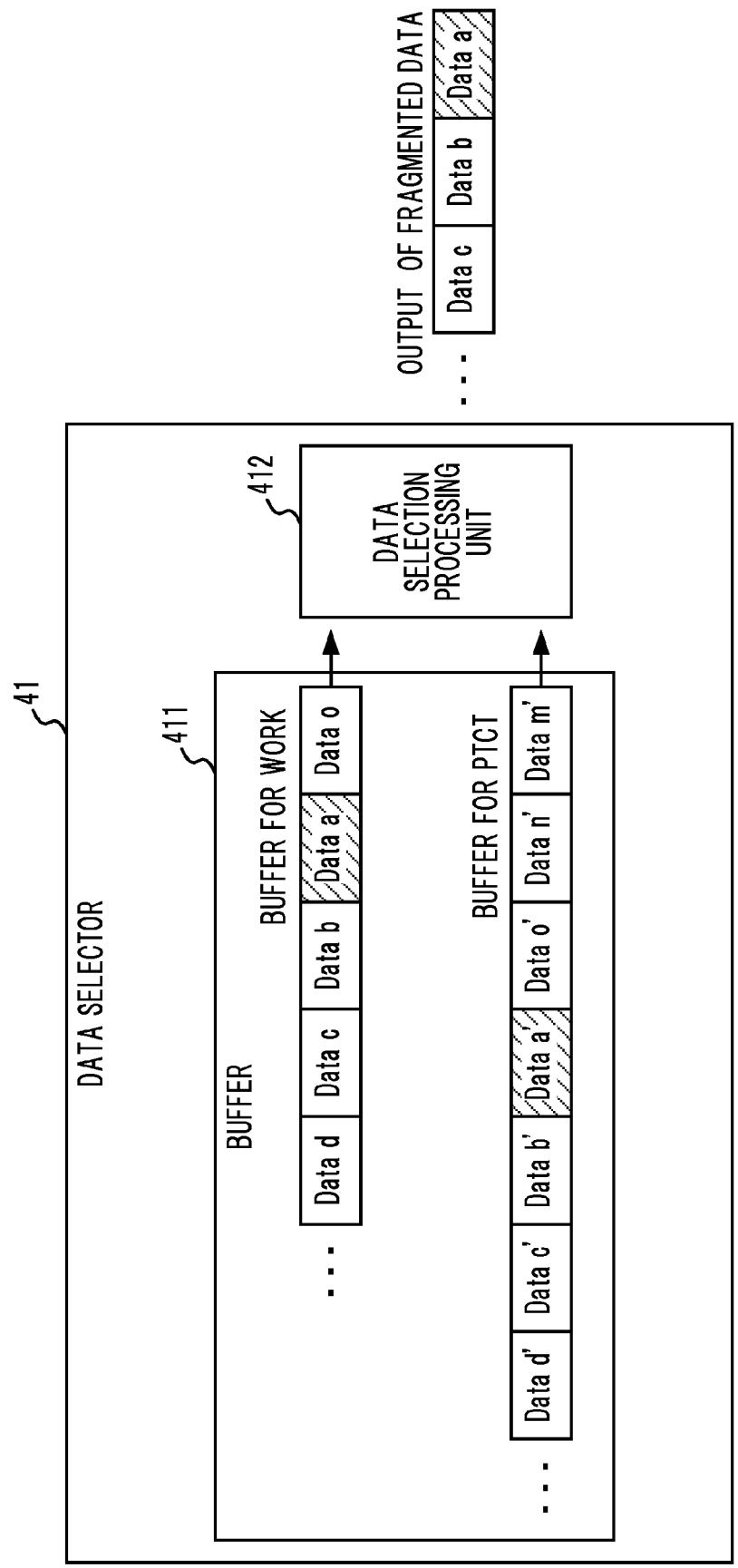

DATA PROCESSING APPARATUS AND REDUNDANCY SWITCHING METHOD

CROSS-REFERENCE TO RELATED APPLICATION(S)

This application is based upon and claims the benefit of priority of the prior Japanese Patent Application No. 2009-068424, filed on Mar. 19, 2009, the entire contents of which are incorporated herein by reference.

FIELD

The embodiments discussed herein are related to data processing apparatus configured to cope with redundancy switching.

BACKGROUND

Recently, network convergence has been promoted. With regard to digital wrapper layers of the OTN (Optical Transport Network) apparatuses and/or the ODU (Optical channel Data Unit) apparatuses provided in the recommendation G. 709 of ITU-T (International Telecommunication Union-Telecommunication sector), a demand as follows has arisen. That is, the demand for a system (such as an OTN Switch (cross connect) and an ODU Switch (cross connect)) having a switching function such as a TSI (Time Slot Interchange) function of SONET (Synchronous Optical NETwork) has arisen.

As for the ODU switching system, many methods of implementing the above mentioned function using an existing packet switch or segment switch are proposed. That is, an ODU frame which has been received from an OTN is fragmented (packetized or segmented using an NPU (Network Processor Unit)). The reason why the frame is fragmented by packetization or segmentation lies in the fact that effective utilization of the existing packet switch and segment switch is realized by fragmenting ODU frames of different formats into general packets or segments. "Packetization" means to fragment a frame into pieces in accordance with an existing standardized packet format and "segmentation" means to fragment a frame into pieces in accordance with a particular format.

In addition, in the OTN for which high reliability of a bearer network is required, a redundancy configuration using a normally used system (Work) and a spare system (Protect, PTCT) (hereinafter, referred to as a Work system and a Protect system) is frequently adopted.

FIG. 1 is a diagram illustrating an example of a data processing apparatus which is connected to an OTN which is configured to have redundancy. In the example illustrated in FIG. 1, the OTN installed between a data processing apparatus 1A and a data processing apparatus 1B has a redundancy configuration constituted by an OTN-W of the Work system and an OTN-P of the Protect system.

Packet data is input from a client into the data processing apparatus 1A using a client interface unit 2A. The client interface unit 2A is then connected with network interface units 4A-W and 4A-P via a switch unit 3A to distribute the packet data to the network interface units 4A-W and 4A-P. The network interface units 4A-W and 4A-P then generate OTU (Optical channel Transport Unit) frames from the input packet data and transmit the generated OTU frames to the OTN-W of the Work system and the OTN-P of the Protect system.

The OTU frames are then input into the data processing apparatus 1B from the OTN-W of the Work system and the OTN-P of the Protect system using network interface units 2B-W and 2B-P respectively. And the network interface units 2B-W and 2B-P then fragment the ODU frames from which OTU overheads have been removed into pieces using NPUs. A switch unit 3B connects the network interface units 2B-W and 2B-P with a client interface unit 4B. The client interface unit 4B performs buffering on fragmented pieces of data sent from the network interface unit 2B-W and fragmented pieces of data sent from the network interface unit 2B-P respectively. The client interface unit 4B selects either of the fragmented pieces of data, restores the selected fragmented pieces of data to the previous ODU frame, adds an OTU overhead to the frame to form an OTU frame and then transmits the formed OTU frame to another OTN apparatus. In normal operation (state), the client interface unit 4B selects the fragmented pieces of data sent from the network interface unit 2B-W. When a fault occurs in the Work system or when the Work system is in maintenance, the client interface unit 4B selects the fragmented pieces of data sent from the network interface unit 2B-P as a protection function. Incidentally, in the example illustrated in the drawing, another OTN apparatus is not configured to have redundancy as it does not constitute a bearer network. However, it may be possible to configure it to have redundancy by branching the data into pieces at the succeeding stages of the network interface units 2B-W and 2B-P and adding a switch unit and a client interface unit thereto.

On the other hand, with the progress of a semiconductor micro-patterning technique, the signal capacity processed using a single interface card is increased. Therefore, the range influenced by a line error which would occur upon switching from the Work system to the Protect system to be performed using the interface card in maintenance is being increased accordingly.

A demand for short-interruption-free (errorless) switching to be performed to avoid the line error as described above is being increased and realization of a system having an errorless switching function is being asked.

Japanese Laid-open Patent Publication No. 6-327074 discloses a technique for preventing cell loss and frame discard from being generated by performing system switching without stopping reception of a packet cell when system switching is performed on a system having a redundancy configuration.

Japanese Laid-open Patent Publication No. 5-130141 discloses a technique for compensating for the sequencing property of packets by buffering information on a time at which a packet is sent out from a transmitting end and information on a time at which the immediately preceding packet has been sent out at a receiving end by packet transmission which is configured to have redundancy, rearranging the packets in time order and then outputting the rearranged packets.

SUMMARY

According to an aspect of the invention, a data processing apparatus includes a first frame processing unit that fragments a first input frame and identifies a head of the first input frame and outputs first head position information; a second frame processing unit that fragments a second input frame which is a redundant frame of the first input frame and is input asynchronously with the first input frame, identifies a head of the second input frame, and outputs second head position information; a first and a second storage unit that receive and store fragmented pieces of data output from the first and the second frame processing units respectively; and a fragmented data processing unit that reads the fragmented pieces of data out of one of the first and second storage units based on the first and second head position information and outputs the fragmented data.

According to another aspect of the invention, a method of performing redundancy switching between a work system data frame and a protection system data frame which are input includes: fragmenting a first input frame; identifying a head of the first frame; outputting first head position information; fragmenting a second input frame which is a redundant frame of the first input frame and is input asynchronously with the first input frame; identifying a head of the second frame; outputting second head position information; and reading the fragmented pieces of data out of one of a first storage unit that receives and stores first fragmented data output from a first frame processing unit and a second storage unit that receives and stores second fragmented pieces of data output from a second frame processing unit, based on the first and second head position information, and outputs the fragmented data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a diagram illustrating a digital wrapper layer of an OTN;

FIG. 4B is a diagram illustrating an OTU frame format;

FIG. 4C is a diagram illustrating details of an FAOH (Frame Alignment Over Head);

FIG. 5 is a diagram illustrating an example of a packaging configuration of a data processing apparatus;

FIG. 14 is a diagram illustrating an example of an operation of a data selector in a fifth processing pattern.

DESCRIPTION OF EMBODIMENTS

Although a system of performing data selection after the data concerned has been restored to that of the ODU level is conceived as a system for realizing the above mentioned protection function of the ODU level, it would be advantageous from the viewpoint of the magnitude of the buffer size to perform data selection in a state in which data is fragmented into pieces after the data has been passed through a switch unit 3B. That is, the buffer size sufficient to buffer at least two or more frames is desired to perform switching at the ODU level.

However, the frame size of the ODU frame is large and hence a buffer size which is large enough to handle the ODU frame is desired. On the other hand, in the case that data is fragmented into pieces, the size of each packet or segment may be reduced and hence the buffer size may be reduced accordingly.

However, basically, the OTN-W is out of synchronization with the OTN-P. Thus, it may sometimes occur that fragmentation executed using the network interface unit 2B-W is out of synchronization with fragmentation executed using the network interface unit 2B-P of the data processing apparatus 1B and hence packets or segments of different sizes are generated. For example, assuming that ODU frames which have been received per unit time n are fragmented, since Frequency of OTN-W≠Frequency of OTN-P, data amounts received per unit time n exhibit a relation expressed by the following formula:

$$\text{Frequency of OTN-}W \times n \neq \text{Frequency of OTN-}P \times n,$$

and the data amounts obtained are different from each other. Accordingly, sizes of packets or segments generated differ for different OTNs.

Thus, in general, it may be difficult to identify which packet or segment corresponds to which data in an ODU frame in a state in which the data is fragmented into packets or segments. Therefore, in the case that system switching (data selection) is performed between the Work system and the Protect system on the side of the client interface unit 4B, data disconnection, overlapping and loss may be generated when the data is observed at the ODU level.

Figure 1:
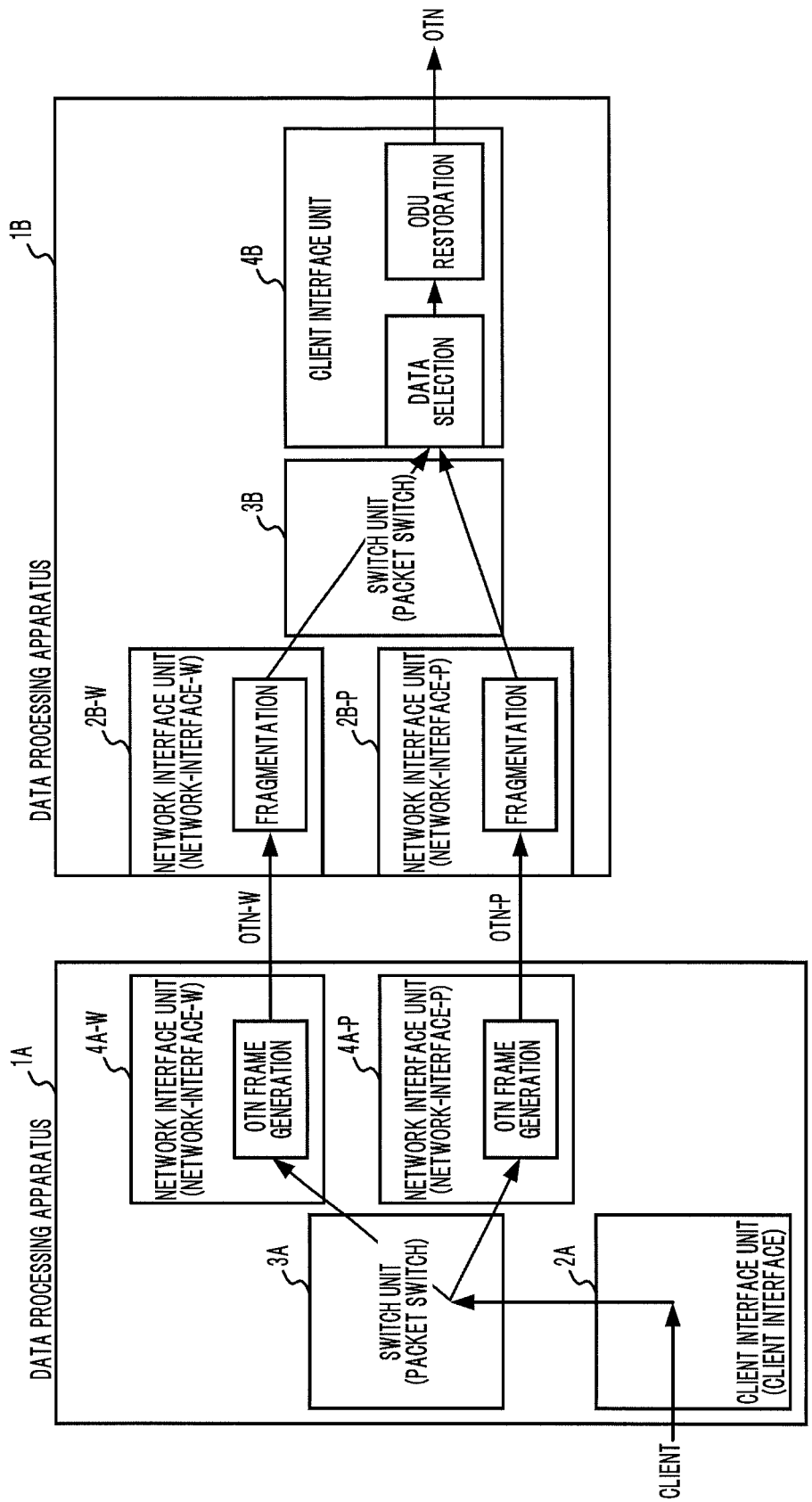
FIG. 1 is a diagram illustrating an example of a data processing apparatus connected to an OTN apparatus configured to have redundancy.
Figure 2:
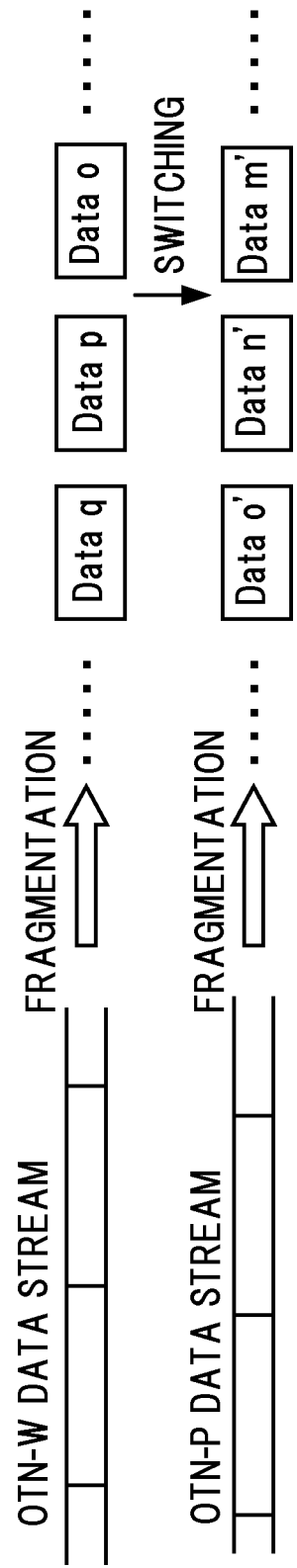
FIG. 2 is a diagram illustrating an example of switching from a Work system to a Protect system.

FIG. 2 is a diagram illustrating an example of switching from a Work system (OTN-W) to a Protect system (OTN-P). In the example illustrated in FIG. 2, it is assumed that fragmented pieces of data Data o, Data p, Data q, ... are generated from a data stream (Data Stream) of the OTN-W and fragmented pieces of data Data m', Data n', Data o', ... are generated from a data stream of the OTN-P. It is also assumed that Data m', Data n', and Data o' of the Protect system overlap pieces of data up to Data o of the Work system. Under the above mentioned assumptions, if data is switched to Data n' directly after Data o has been read out, the Data n' and Data o' will overlap pieces of data of the Work system.

In the case that redundancy switching is performed in the above mentioned manner, data disconnection, overlapping and/or loss may be generated when the ODU frame is restored due to a difference in size between segmented pieces of data generated in the Work system and the Protect system and hence a line error may occur in an output signal accordingly.

Next, preferred embodiments will be described.

Configuration

Figure 3:
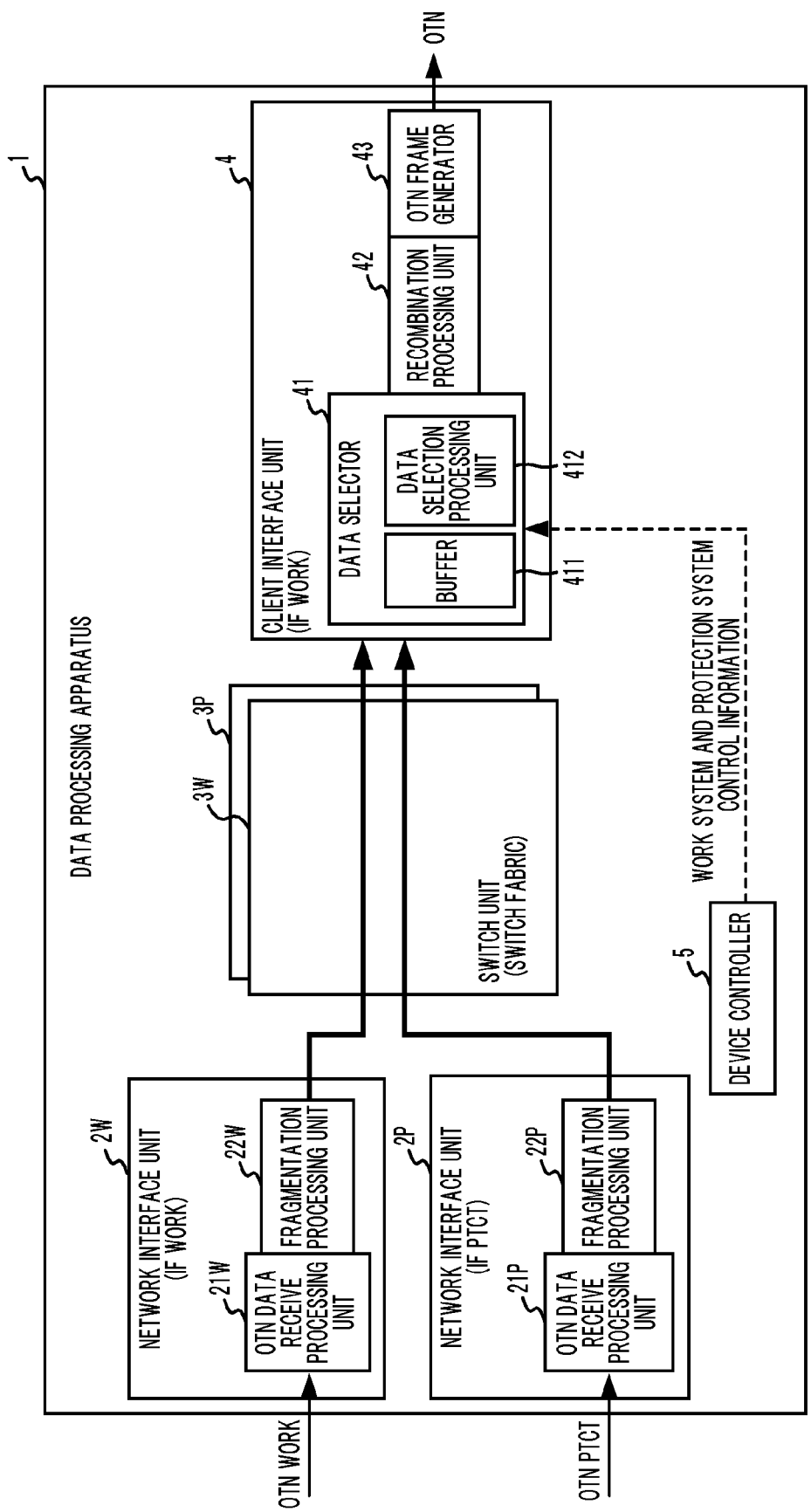
FIG. 3 is a diagram illustrating an example of a configuration of a data processing apparatus according to one embodiment.

FIG. 3 is a diagram illustrating an example of a configuration of a data processing apparatus according to one embodiment.

In FIG. 3, a data processing apparatus 1 includes a network interface unit (IF Work) 2W and a network interface unit (IF PTCT) 2P. The data processing apparatus 1 further includes switch units (Switch Fabrics) 3W and 3P, a client interface unit (IF Work) 4, and a device controller 5.

The network interface units 2W and 2P respectively include OTN data receive processing units 21W and 21P which are respectively connected to the OTN (OTN WORK) of the Work system and the OTN (OTN PTCT) of the Protect system to perform receive processing (end processing) on OTU frames. The OTN frames, which received from OTN WORK and OTN PTCT respectively, are substantially the same frames because OTN WORK and OTN PTCT are mutually redundant relationship. For example, in the sending side, frames are copied and sending to OTN WORK and OTN PTCT. The network interface units 2W and 2P respectively include fragmentation processing units 22W and 22P that fragment ODUs (ODU frames) included in the OTU frames into pieces of data such as packets or segments.

FIG. 4A is a diagram illustrating a digital wrapper layer of the OTN, and FIG. 4B is a diagram illustrating a format of the OTN frame. As illustrated in FIG. 4A, the digital wrapper layer of the OTN has a hierarchical structure consisting of an OTU (Optical channel Transport Unit), an ODU (Optical channel Data Unit), an OPU (Optical channel Payload Unit), and an OPU Payload (Client Signal). As illustrated in FIG. 4B, at the head of the OTU frame, an overhead (OH) is present, and at the head of the overhead, an FAOH (Frame Alignment OH) is present. FIG. 4C is a diagram illustrating details of the FAOH (Frame Alignment Over Head).

Returning to FIG. 3, description will be further made. As illustrated in FIG. 3, the fragmentation processing units 22W and 22P of the network interface units 2W and 2P recognize the heads of the ODU frames based on the above mentioned FAOHs and perform any one of the following processing operations.

(1) A first processing pattern: fragmentation is performed on each ODU frame starting from the head of the ODU frame, and a flag "ODU Head" is attached to a fragmented piece of data which is at the head of the frame.

(2) A second processing pattern: fragmentation is performed on each ODU frame starting from the head of the ODU frame, and a special purpose "ODU Head" fragmented piece of data is inserted into a position directly before the fragmented piece of data corresponding to the head of each frame.

(3) A third processing pattern: fragmentation is performed on each ODU frame starting from an arbitrary position of the ODU frame, and offset data indicative of the number of bytes counted from the head of the ODU frame is attached to each fragmented piece of data.

The switch units 3W and 3P exchange with each other the fragmented pieces of data output from the network interface units 2W and 2P and output the exchanged fragmented pieces of data to the client interface unit 4.

The client interface unit 4 includes a data selector 41, a recombination processing unit 42, and an OTN frame generator 43.

The data selector 41 includes a buffer 411 and a data selection processing unit 412 and temporarily stores the fragmented pieces of data input from the switch units 3W and 3P in the buffer 411. The data selector 41 performs switching using the data selection processing unit 412 at a timing so that data loss or overlapping may not be generated in accordance with Work system and Protect system control information sent from the apparatus controller 5. Switching may be performed when specifying a switch position in the buffer 411 based on position information (a head position, offset) on the fragmented data side, and may be performed when managing the number of processed bytes on the data selector 41 side by using a timing that the position information of the fragmented data side as a reset timing. Details of the switching will be described later.

The recombination processing unit 42 removes the head and the flag from the fragmented piece of data selected using the data selector 41 and also removes the fragmented piece of data indicative of the head of the above mentioned ODU frame to reproduce (assemble) the ODU frame.

The OTN frame generator 43 generates an OTU frame from the ODU frame which has been reproduced using the recombination processing unit 42 and sends the reproduced OTU frame to another OTN. In the example illustrated in the drawing, another OTN has no redundancy configuration when the other OTN is not a bearer network, etc. However, another OTN may be configured to have redundancy by branching the data at succeeding stages of the network interface units 2W and 2P and adding a switch unit and a client interface unit to another OTN.

The apparatus controller 5 controls operations of respective units in the data processing apparatus 1 and sends Work system and Protect system control information to the client interface unit 4.

FIG. 5 is a diagram illustrating an example of a packaging configuration of the data processing apparatus 1. The apparatus controller 5 in FIG. 3 corresponds to a card C1. Likewise, the switch units 3W and 3P correspond to cards C4 and C3 and the network interface units 2W and 2P and the client interface unit 4 correspond to groups of cards C2 and C5.

Figure 6:
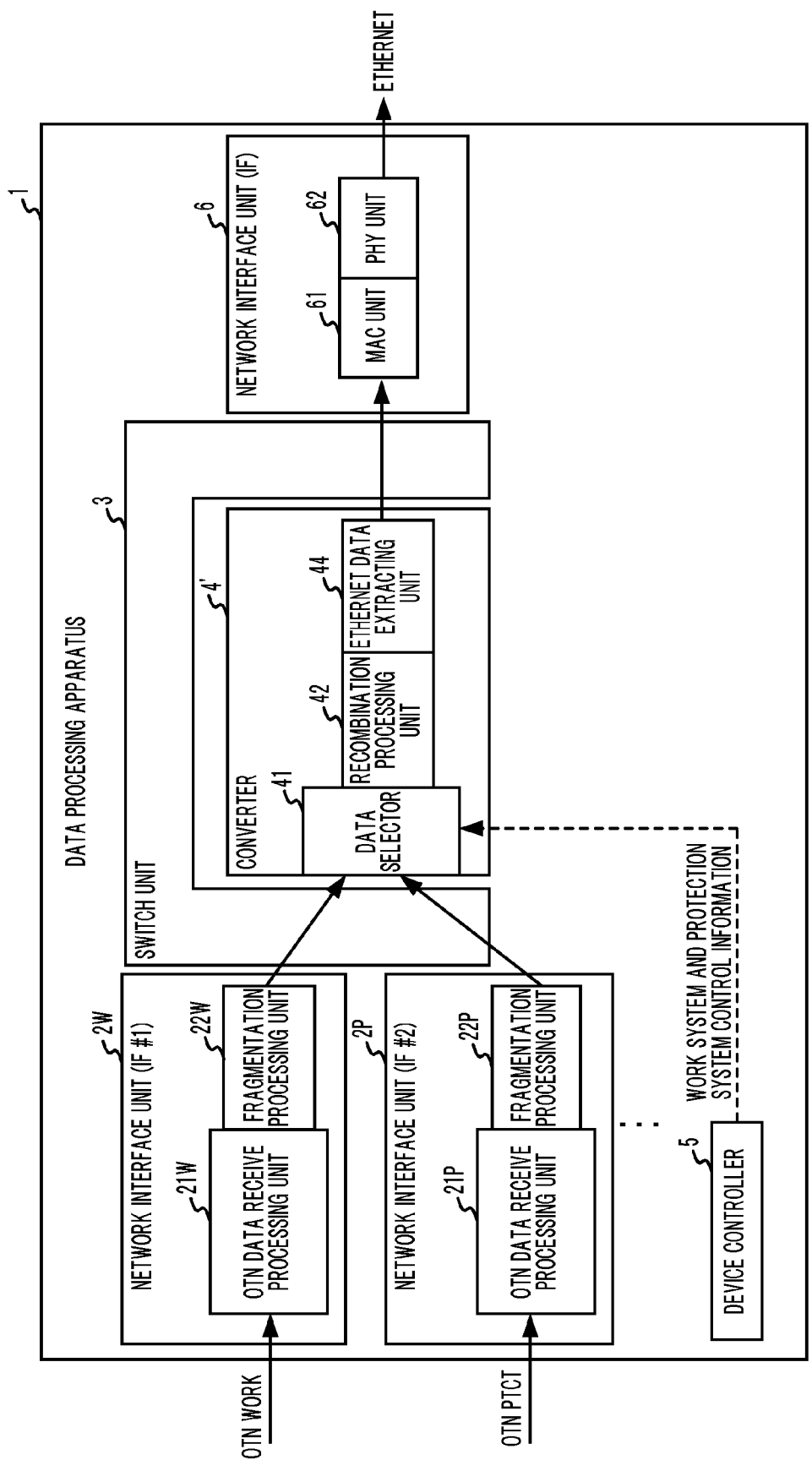
FIG. 6 is a diagram illustrating an example of a configuration of a data processing apparatus configured to connect an OTN of a redundancy configuration with Ethernet (registered trademark)

FIG. 6 is a diagram illustrating an example of a configuration of a data processing apparatus that connects an OTN which is configured to have redundancy with Ethernet (registered trademark). In the data processing apparatus 1 illustrated in FIG. 6, a converter 4' is installed in place of the client interface unit 4 illustrated in FIG. 3, and a network interface unit 6 which is connected to the converter 4 via the switch unit 3 is additionally provided. Although the converter 4' performs substantially the same processing as the client interface unit 4 in FIG. 3, the output side of the data processing apparatus 1 is to be configured to cope with Ethernet (registered trademark) and hence an Ethernet (registered trademark) data extracting unit 44 is replaced with the OTN frame generator 43 illustrated in FIG. 3. The network interface unit 6 includes an MAC unit 61 that performs MAC (Media Access Control) processing and a PHY unit 62 that performs physical layer processing.

Owing to the above mentioned configuration, an Ethernet frame may be output by performing the same operations as those performed using the data processing apparatus in FIG. 3.

Operations

Next, operations will be described based on the data processing apparatus in FIG. 3.

Operation: First Processing Pattern

Figure 7:
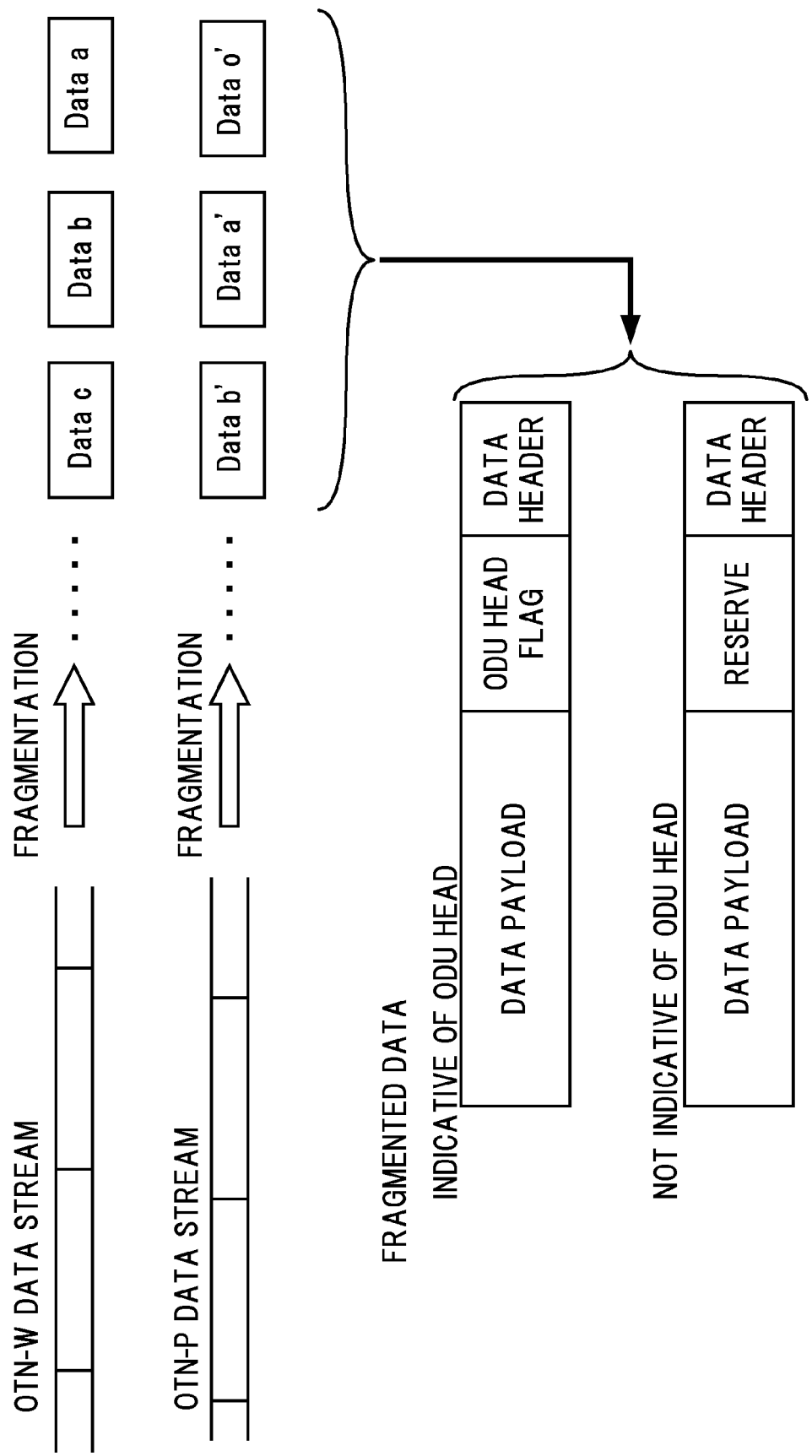
FIG. 7 is a diagram illustrating examples of operations of OTN data receive processing units and fragmentation processing units in a first processing pattern.

FIG. 7 is a diagram illustrating examples of operations of the OTN data receive processing units 21W and 21P and the fragmentation processing units 22W and 22P in the first processing pattern. In the first processing pattern, in response to detection of the FAOHs (see FIGS. 4B and 4C) from the OTU frames which have been input into the network interface units 2W and 2P by using the OTN data receive processing units 21W and 21P, the fragmentation processing units 22W and 22P respectively fragment the input ODU frames starting from the heads. The fragmentation processing units 22W and 22P attach "ODU Head" flags to the head fragmented pieces of data.

In the example illustrated in FIG. 7, Data a, Data b, Data c, . . . are fragmented from the OTN-W data stream of the Work system and Data o', Data a', Data b', . . . are fragmented from the OTN-P data stream of the Protect system. The "ODU Head" flag is attached to the reserve area following the header (Data Header) of a fragmented piece of data corresponding to the head of the ODU frame. The reserve area of a fragmented piece of data which does not correspond to the head of the ODU frame remains unused.

Figure 8:
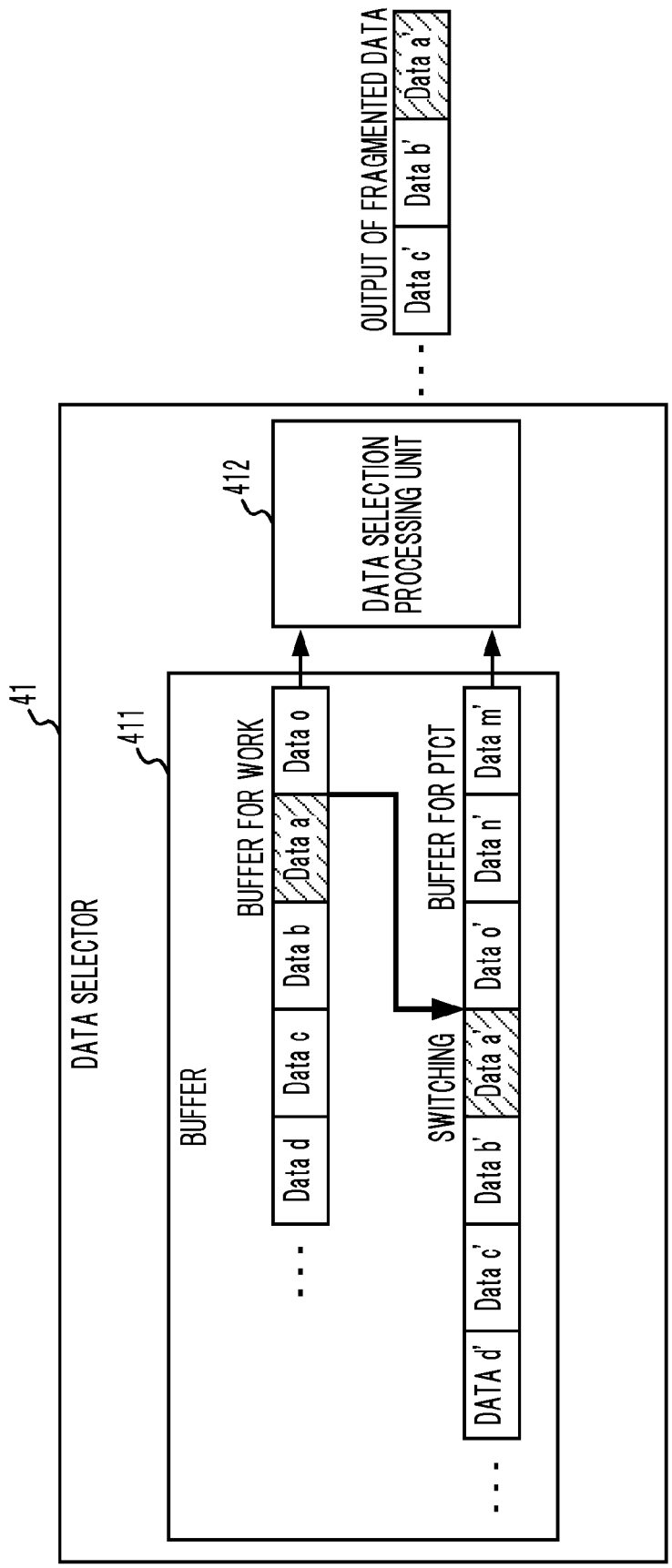
FIG. 8 is a diagram illustrating an example of an operation of a data selector in the first processing pattern.

FIG. 8 is a diagram illustrating an example of an operation of the data selector 41 in the first processing pattern. It is assumed that the data selector 41 retains the buffer size corresponding to one ODU frame in the buffer 411.

It is assumed that Data o, Data a, Data b, Data c, Data d, . . . are accumulated in the buffer area for the Work system and Data m', Data n', Data o', Data a', Data b', Data c', Data d', . . . are accumulated in the buffer area for the Protect system in the buffer 411 of the data selector 41.

The data selection processing unit 412 monitors (detects) fragmented pieces of data to which the "ODU Head" flags are attached from the fragmented pieces of data in the respective buffer areas for the Work system and the Protect system. When a switch request is made from the apparatus controller 5 in accordance with the Work system and Protect system control information, the data selection processing unit 412 specifies Data a in the buffer area for the Work system and Data a' in the buffer area for the Protect system. The buffer size corresponding to one ODU frame is retained in the buffer 411, so that even though the OTN-W data stream is out of synchronization with the OTN-P data stream, the head data of the ODU frame may be present in both the buffer areas for the Work and Protect systems.

The data selection processing unit 412 switches the read position to Data a' of the Protect system immediately after the final fragmented piece of data Data o which immediately precedes Data a in the current frame of the Work system has been read out. Data m', Data n' and Data o' in the buffer area for the Protect system are overlapping data and hence are discarded. The Work system is replaced with the Protect system by performing switching in the above mentioned manner.

Owing to the above mentioned operations, switching may be performed without causing data loss or overlapping.

Operation: Second Processing Pattern.

Figure 9:
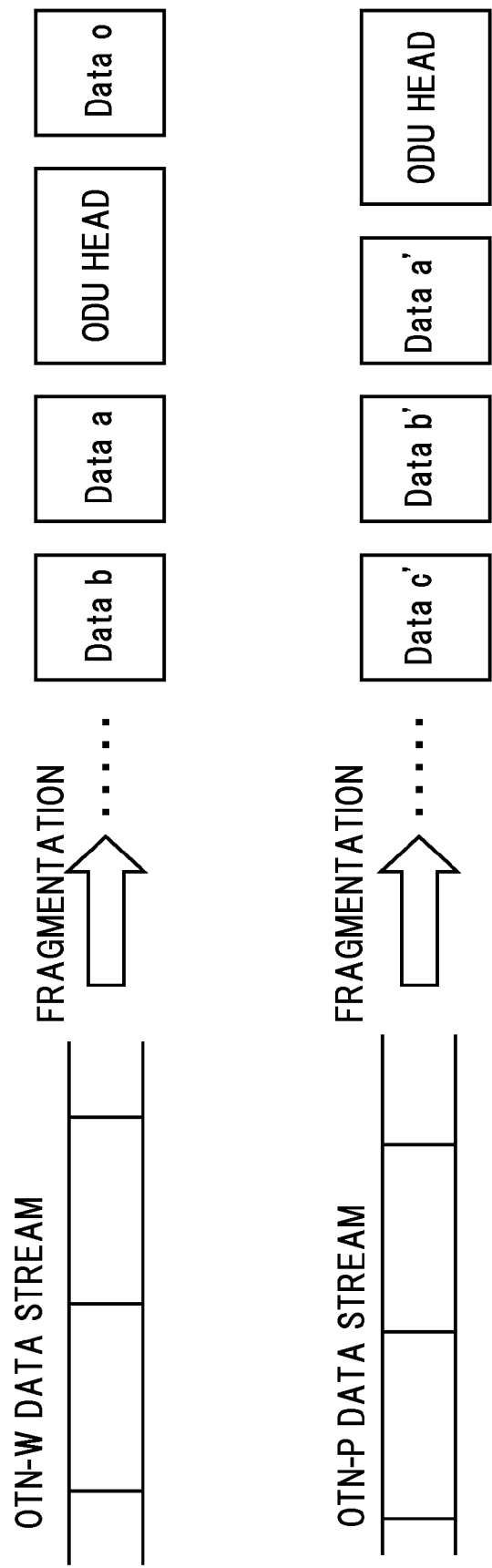
FIG. 9 is a diagram illustrating examples of operations of OTN data receive processing units and fragmentation processing units in a second processing pattern.

FIG. 9 is a diagram illustrating examples of operations of the OTN data receive processing units 21W and 21P and the fragmentation processing units 22W and 22P in the second processing pattern. In the second processing pattern, in response to detection of the FAOHs (FIGS. 4B and 4C) from the OTN frames which have been input into the network interface units 2W and 2P by using the OTN data receive processing units 21W and 21P, the fragmentation processing units 22W and 22P fragment the input ODU frames starting from the heads thereof. The fragmentation processing units 22W and 22P insert special purpose "ODU Head" fragmented pieces of data into positions immediately before the head fragmented pieces of data in the respective frames. That is, the fragmentation processing units 22W and 22P generate the special fragmented pieces of data indicative of the heads of the respective ODU frames and output the special fragmented pieces of data before outputting the fragmented pieces of data as the heads of the frames.

In the example illustrated in FIG. 9, the special purpose "ODU Head" fragmented piece of data is inserted into the position immediately before Data a of the OTN-W of the Work system, and the special purpose "ODU Head" fragmented piece of data is inserted into the position immediately before Data a' of the OTN-P of the Protect system.

Figure 10:
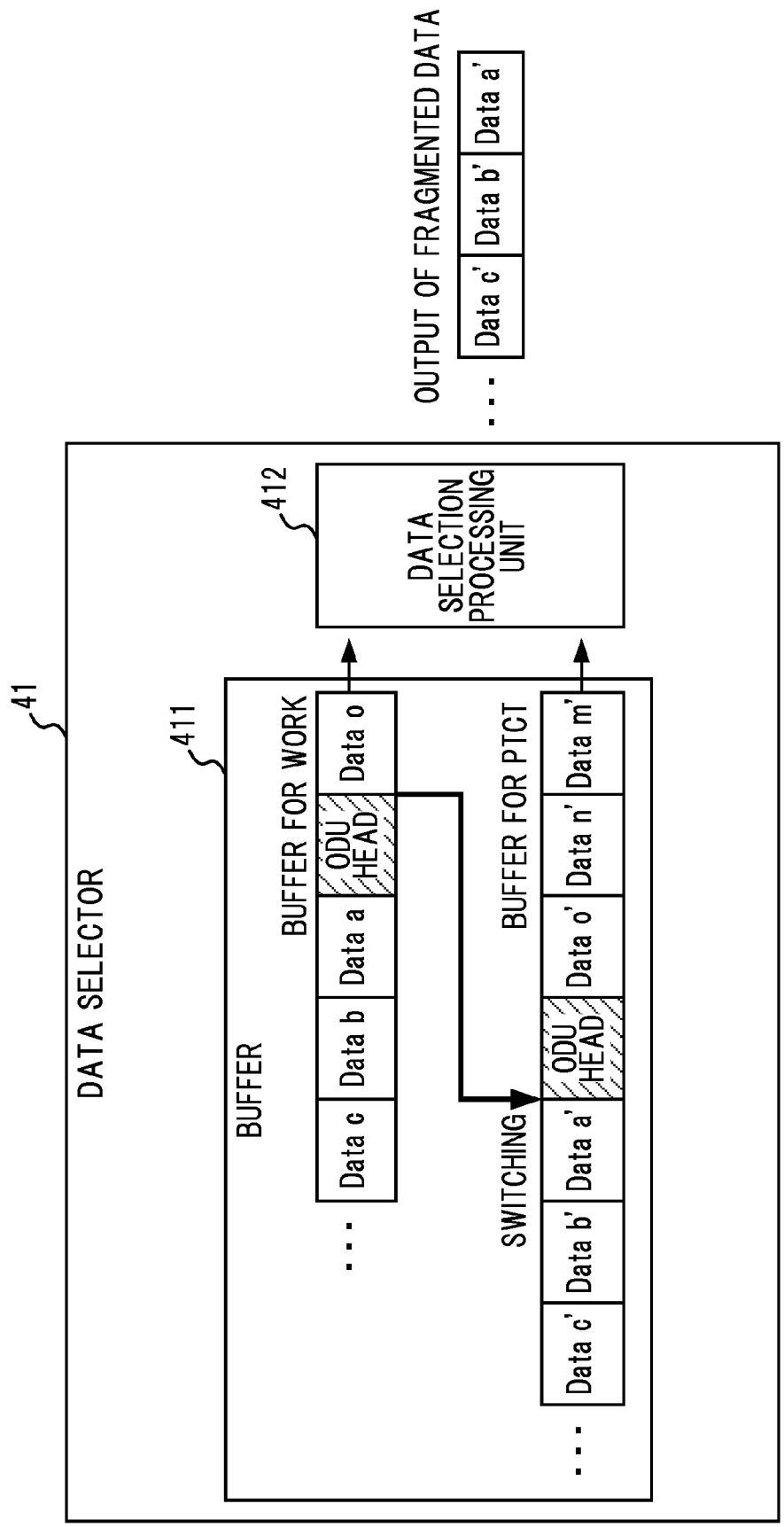
FIG. 10 is a diagram illustrating an example of an operation of a data selector in the second processing pattern.

FIG. 10 is a diagram illustrating an example of an operation of the data selector 41 in the second processing patter. It is assumed that the data selector 41 retains the buffer size corresponding to one ODU frame in the buffer 411.

It is also assumed that Data o, ODU Head, Data a, Data b, Data c, . . . are accumulated in the buffer area for the Work system and Data m', Data n', Data o', ODU Head, Data a', Data b', Data c', . . . are accumulated in the buffer area for the Protect system in the buffer 411 of the data selector 41.

The data selection processing unit 412 monitors the special purpose "ODU Head" fragmented pieces of data from the fragmented pieces of data in the buffer areas for the Work and Protect systems and, when a switch request is made from the apparatus controller 5 in accordance with the Work system and Protect system control information, specifies the respective "ODU Head" fragmented pieces of data in the frames of the systems. The buffer size corresponding to one ODU frame is retained in the buffer 411, so that the head data of the ODU frames may be present in both the buffer areas for the Work and Protect systems and the "ODU Head" fragmented pieces of data may also be present in both the buffer areas even though the OTN-W data stream is out of synchronization with the OTN-P data stream.

The data selection processing unit 412 switches the read position to Data a' following the "ODU Head" fragmented piece of data of the Protect system immediately after the last fragmented piece of data Data o which immediately precedes the "ODU Head" fragmented piece of data of the Work system has been read out. Data m', Data n' and Data o' in the buffer area for the Protect system are overlapping data and hence are discarded.

Owing to the above mentioned operations, switching may be performed without causing data loss or overlapping.

Operation: Third Processing Pattern

Figure 11:
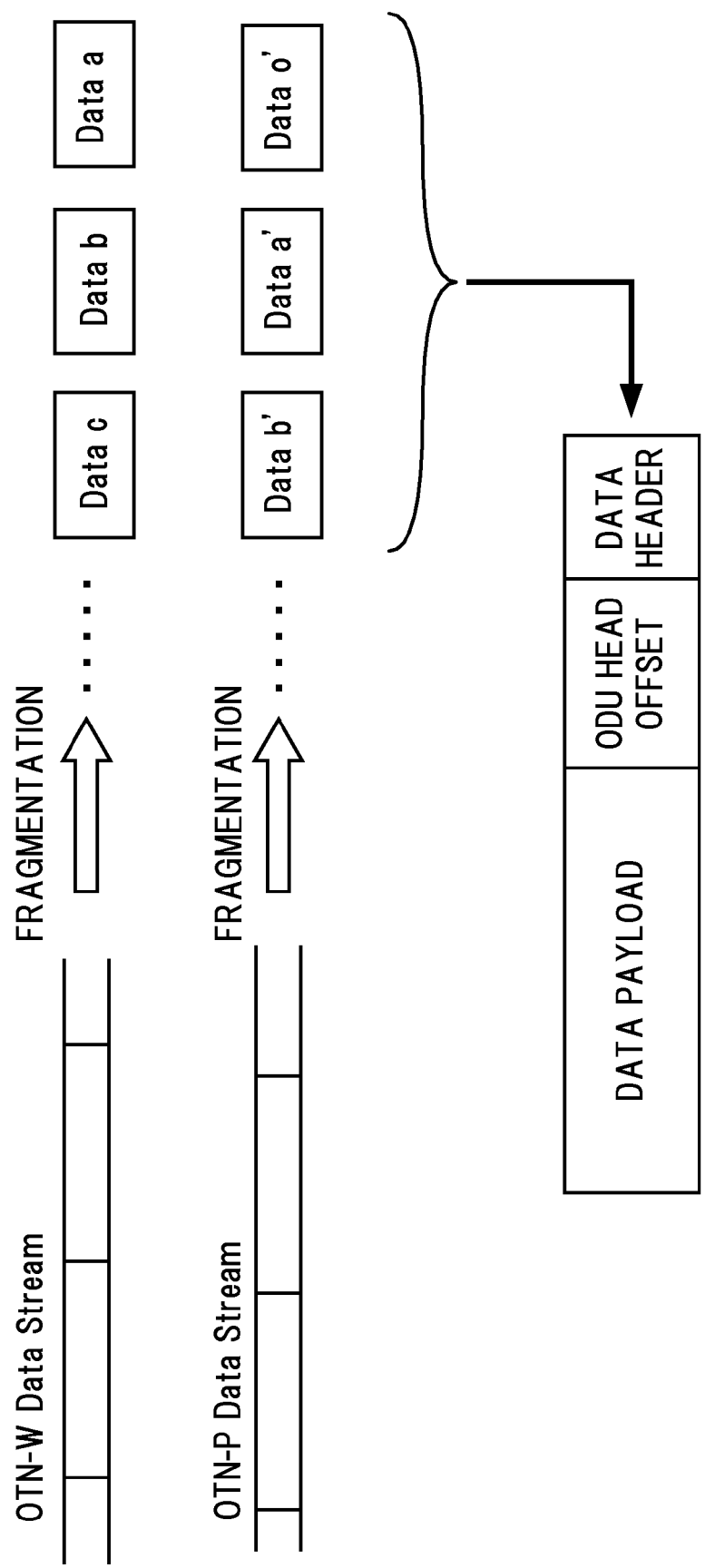
FIG. 11 is a diagram illustrating examples of operations of OTN data receive processing units and fragmentation processing units in a third processing pattern.

FIG. 11 is a diagram illustrating examples of operations of the OTN receive processing units 21W and 21P and the fragmentation processing units 22W and 22P. In the third processing pattern, the fragmentation processing units 22W and 22P of the network interface units 2W and P perform fragmentation starting from arbitrary positions of the ODU frames and attach offset data indicative of the numbers of bytes counted from the heads of the ODU frames to respective fragmented pieces of data. That is, data to identify where a position counted from the head of each ODU frame each fragmented piece of data is situated is embedded in each fragmented piece of data.

In the third processing pattern, it may not be necessary to start fragmentation from the head of each ODU frame unlike in the first and second processing patterns. The numbers of bytes counted from the heads of the respective ODU frames are acquired based on the timings at which the OTN data receive processing units 21W and 21P have detected the FAOHs concerned (see FIGS. 4B and 4C).

In the example illustrated in FIG. 11, Data a, Data b, Data c, . . . are fragmented from the OTN-W data stream of the Work system and Data o', Data a', Data b', . . . are fragmented from the OTN-P data stream of the Protect system. In addition, offset data (ODU Head Offset) is attached to the reserve area following the header in each fragmented piece of data.

Figure 12:
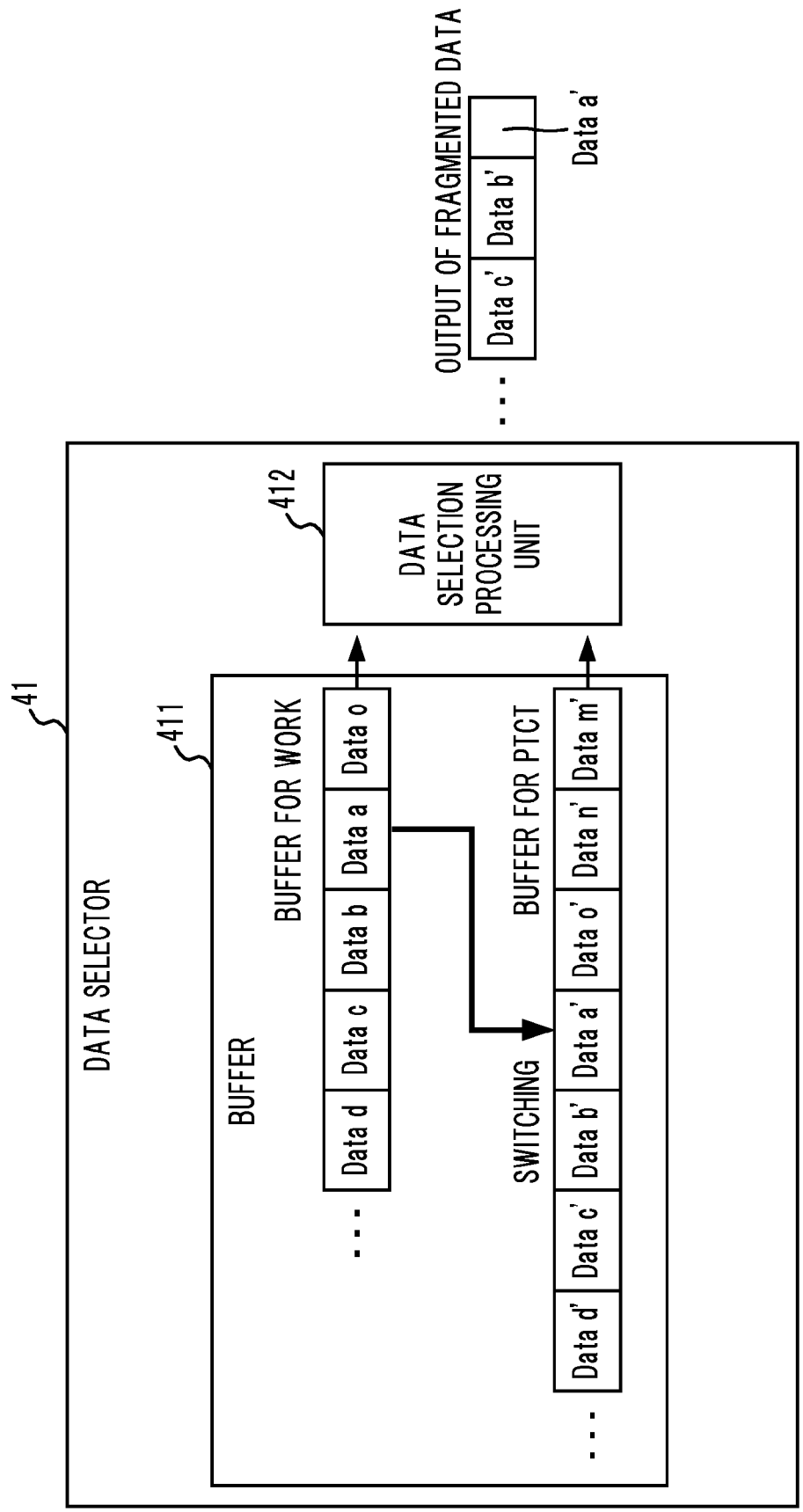
FIG. 12 is a diagram illustrating an example of an operation of a data selector in the third processing pattern.

FIG. 12 is a diagram illustrating an example of an operation of the data selector 41 in the third processing pattern. It is assumed that the data selector 41 retains the buffer size corresponding to one ODU frame in the buffer 411.

It is also assumed that Data o, Data a, Data b, Data c, Data d, . . . are accumulated in the buffer area for the Work system and Data m', Data n', Data o', Data a', Data b', Data c', Data d', . . . are accumulated in the buffer area for the Protect system in the buffer 411 of the data selector 41.

The data selection processing unit 412 monitors the offset data from the fragmented pieces of data in the respective buffer areas for the Work and Protect systems. Then, when a switch request is made from the apparatus controller 5 in accordance with the Work system and Protect system control information, the data selection processing unit 412 calculates the positions corresponding to the heads of the respective ODU frames from the offset data in consideration of the sizes of the respective headers. In the example illustrated in FIG. 12, it is assumed that the switch request has been made while Data a for the Work system is being output and Data a' for the Protect system is being output. Since the buffer size corresponding to one ODU frame is retained, the head data of the respective ODU frames may be present in both the buffer areas for the Work and Protect systems even though the OTN-W data stream is out of synchronization with the OTN-P data stream.

The data selection processing unit 412 switches the read-out position to the middle of Data a' which is at the head position of the frame for the Protect system immediately after data reading up to the middle of Data a which is at the head position of the frame for the Work system has been performed. Data m', Data n', Data o' and data up to the middle of Data a' in the buffer area for the Protect system are overlapping data and hence are discarded.

Owing to the above mentioned operations, switching may be performed without causing data loss or overlapping.

Switching from the end of one ODU frame to the head of another ODU frame has been described. As an alternative, switching from an arbitrary byte position may be possible.

Operation: Fourth Processing Pattern

In the above examples of the above mentioned first to third processing patterns, the buffer size corresponding to one ODU frame is retained in security for presence of the head positions of the frames for the Work and Protect systems in the buffer 411 of the data selector 41. Therefore, the buffer size is increased, which may be disadvantageous in terms of the cost. In addition, processing is performed starting from the head after the fragmented pieces of data corresponding to one frame have been accumulated, so that a transmission delay (Latency) of one frame may be generated.

Thus in the fourth processing pattern, a system for data selection is devised to reduce the buffer size and the transmission delay. In the fourth processing patterns, it may be also desired to know to which position in the original ODU frame each fragmented piece of data corresponds as in the above mentioned first to third processing patterns. Therefore, the mechanism for attaching the "ODU Head" flag to the fragmented piece of data concerned, for inserting the special purpose "ODU Head" fragmented piece of data into the position immediately before the head data concerned and/or for attaching offset data to the reserve area concerned in the first to third processing patterns may be preserved.

Figure 13:
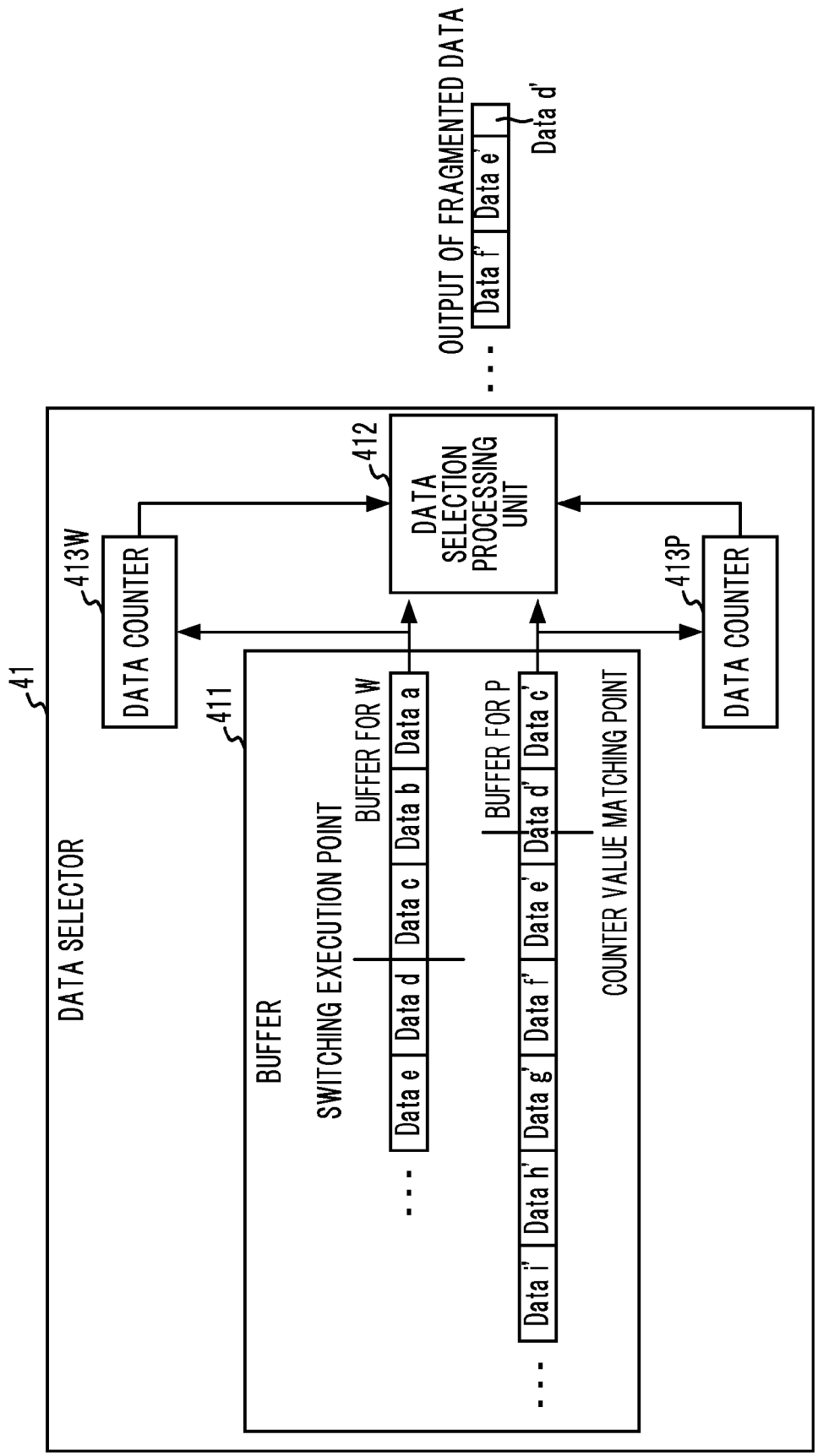
FIG. 13 is a diagram illustrating an example of an operation of a data selector in a fourth processing pattern.

FIG. 13 is a diagram illustrating an example of an operation of the data selector 41 in the firth processing pattern.

In the fourth processing pattern, a data counter 413W for the Work system and a data counter 413P for the Protect system are added to the data selector 41. In the case that the fragmented pieces of data are to be read out of the buffer areas for the Work and Protect Systems, the data counters 413W and 413P are reset at the heads of the ODU frames to count up the values in units of bytes of the payloads which have been read out. Resetting of the data counters 413W and 413P is performed at the heads of the payload parts of the fragmented pieces of data from which the "ODU Head" flags have been detected in the processing pattern in which the "ODU Head" flags are attached. In addition, resetting of the data counters 413W and 413P is performed at the heads of the payload parts of the fragmented pieces of data following the "ODU Head" fragmented pieces of data in the processing pattern in which the special purpose "ODU Head" fragmented piece of data are inserted. Further, resetting of the data counters 413W and 413P is performed at the heads of the payload parts of the fragmented pieces of data in which the offset data is reduced to zero in the processing pattern in which the offset data is attached.

Now, it is assumed that switching is performed immediately after Data c of the Work system has been processed and the count value which is counted using the data counter 413W upon switching is N bytes. Under the above mentioned assumption, the data selection processing unit 412 switches the read-out position to the middle of corresponding Data d' of the Protect system. The preceding pieces of data in the buffer area for the Protect system are overlapping data and hence are discarded.

Owing to the above mentioned operations, switching may be performed without causing data loss or overlapping. In addition, the buffer 411 may only have the buffer size sufficient to cope with a difference in allowable delay between the Work and Protect systems. Therefore, buffer size reduction and transmission delay reduction may be attained.

Operation: Fifth Processing Pattern

In the examples of above mentioned first to fourth processing patterns, switching from the Work system to the Protect system in response to the switch request from the apparatus controller 5 has been described. On the other hand, in the fifth processing pattern, the data selector 41 autonomously performs switching to reduce a difference in transmission delay between the Work and Protection systems, without responding to the switch request from the apparatus controller 5.

FIG. 14 is a diagram illustrating an example of an operation of the data selector 41 in the fifth processing pattern. The fifth processing pattern is configured on the assumption that the "ODU Head" flag is attached to the head concerned in the first processing pattern. However, the fifth pattern may also be applied to the case in which the special purpose "ODU Head" fragmented piece of data is inserted into the position in the second processing pattern and to the case in which the offset data is attached to the preserve area in the third processing pattern.

In the example illustrated in FIG. 14, the data selection processing unit 412 of the data selector 41 monitors the positions corresponding to the heads of the respective ODU frames from the fragmented pieces of data in the buffer areas for the Work and Protect Systems in the buffer 411 and selects one frame head position of which has arrived earlier than the head position of another frame in terms of phase. In the example illustrated in FIG. 14, the head position of the Work system side frame comes first and hence the Work system side frame is selected.

Owing to the above mentioned operations, the frame on the side which is smaller in transmission delay is generally selected and hence the transmission delay difference may be reduced.

As described above, according to the above mentioned embodiments, advantages as described hereinbelow may be obtained. (1) Upon fragmentation, data with which the head positions of respective ODU frames are identified is attached to identify the head positions when the data to be switched is selected, thereby realizing execution of redundancy switching while maintaining continuity in the ODU frames and hence errorless and short-interruption-free redundancy switching. (2) The number of bytes read out of the buffer is managed to perform data selection, thereby realizing reduction of buffer size and transmission delay. (3) The head position information of the Work system is compared with that of the Protect system to generally select the first arrived side, thereby generally minimizing the transmission delay.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data processing apparatus comprising:
    a first frame processor that fragments a first input frame into a first sequence of data segments, and outputs the first sequence of data segments along with first position information indicative of a position of a data segment within the first input frame;
    a second frame processor that fragments a second input frame into a second sequence of data segments, the second input frame being a redundant frame of the first input frame and being input asynchronously with the first input frame, and outputs the second sequence of data segments along with second position information indicative of a position of a data segment within the second input frame;
    a first storage and a second storage that receive and store data segments output from the first and the second frame processors respectively; and
    a fragmented data processor that determines which of the first input frame and the second input frame arrives first by comparing the first position information of the first sequence of data segments and the second position information of the second sequence of data segments, switchably reads out data segments from one of the first storage and the second storage based upon the comparing of the first position information and the second position information and outputs the data segments,
    wherein when a reading of data from one of the first storage and the second storage is switched to the other of the first storage and the second storage, the fragmented data processor combines a first portion of the first sequence of data segments that have been read out from the first storage and a second portion of the second sequence of data segments that have been read out from the second storage into a third sequence of data segments used to reproduce the first input frame without loss or duplication of data, and
    wherein the third sequence of data segments are output.

2. The data processing apparatus according to claim 1, wherein the first frame processor performs fragmentation starting from a first head of the first input frame and attaches the first position information indicative of the first head of the first input frame to a first data segment that includes the first head of the first input frame, and
    the second frame processor performs fragmentation starting from a second head of the second input frame and attaches the second position information indicative of the second head of the second input frame to a second data segment that includes the second head of the second input frame.

3. The data processing apparatus according to claim 1, wherein the first frame processor performs fragmentation starting from a first head of the first input frame and inserts the first position information indicative of the first head of the first input frame into a position immediately before a first data segment that includes the first head of the first input frame, as a first special purpose data segment, and
    the second frame processor performs fragmentation starting from a second head of the second input frame and inserts the second position information indicative of the second head of the second input frame into a position immediately before a second data segment including the second head of the second input frame, as a second special purpose data segment.

4. The data processing apparatus according to claim 1, wherein the first frame processor performs fragmentation starting from an arbitrary position of the first input frame and attaches the first position information indicative of an address within the first input frame to each of the first sequence of data segments, and
    the second frame processor performs fragmentation starting from an arbitrary position of the second input frame and attaches the second position information indicative of an address within the second input frame to each of the second sequence of data segments.

5. The data processing apparatus according to claim 1, wherein the fragmented data processor includes
    a first data counter that counts a value corresponding with a payload which has been read out including each of the first sequence of data segments within the first input frame and a second data counter that counts a value corresponding with a payload which has been read out including each of the second sequence of data segments within the second input frame, and determines a switch data position at which the first portion of the first sequence of data segments and the second portion of the second sequence of data segments are combined into the third sequence of data segments, using respective values of the first and second data counters.

6. A method of performing redundancy switching between a work system data frame and a protection system data frame which are input, the method comprising:
    fragmenting a first input frame into a first sequence of data segments;
    outputting the first sequence of data segments along with first position information indicative of a position of a data segment within the first input frame;
    fragmenting a second input frame into a second sequence of data segments, the second input frame being a redundant frame of the first input frame and being input asynchronously with the first input frame;
    outputting the second sequence of data segments along with second position information indicative of a position of a data segment within the second input frame;
    determining arrival which of the first input frame and the second input frame arrives first by comparing the first position information of the first sequence of data segments and the second position information of the second sequence of data segments; and switchably reading out data segments from one of a first storage unit that receives and stores the first sequence of data segments, and a second storage unit that receives and stores the second sequence of data segments, based upon the comparing of the first position information and the second position information, and outputting the data segments, wherein when a reading of data from one of the first storage unit and the second storage unit is switched to the other of the first storage unit and the second storage unit, a first portion of the first sequence of data segments that have been read out from the first storage unit and a second portion of the second sequence of data segments that have been read out from the second storage unit are combined into a third sequence of data segments used to reproduce the first input frame without loss or duplication of data, and wherein the third sequence of data segments are output.

* * * * *